(12) United States Patent
Shaik et al.

(10) Patent No.: US 10,696,910 B2
(45) Date of Patent: Jun. 30, 2020

(54) SYSTEMS AND METHODS FOR PROCESSING HEAVY OILS BY OIL UPGRADING FOLLOWED BY DISTILLATION

(71) Applicant: Saudi Arabian Oil Company, Dhahran (SA)

(72) Inventors: Kareemuddin Shaik, Dhahran (SA); Lianhui Ding, Dhahran (SA); Mazin Tamimi, Dhahran (SA); Ibrahim Abba, Dhahran (SA); Abdennour Bourane, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/036,283

(22) Filed: Jul. 16, 2018

(65) Prior Publication Data

US 2019/0016971 A1    Jan. 17, 2019

Related U.S. Application Data

(60) Provisional application No. 62/533,416, filed on Jul. 17, 2017.

(51) Int. Cl.
*C10G 67/02* (2006.01)
*B01J 35/10* (2006.01)
(Continued)

(52) U.S. Cl.
CPC .......... *C10G 67/02* (2013.01); *B01J 35/1061* (2013.01); *C10G 45/08* (2013.01); *C10G 47/20* (2013.01);
(Continued)

(58) Field of Classification Search
CPC ........ C10G 45/08; C10G 47/20; C10G 53/02; C10G 57/00; C10G 65/10; C10G 65/12;
(Continued)

(56) References Cited

U.S. PATENT DOCUMENTS 2,358,150 A     9/1944  Cooke
3,617,493 A    11/1971  Wirth et al.
(Continued)

FOREIGN PATENT DOCUMENTS

EP    0197289 A2    10/1986
EP    1600491 A1    11/2005
(Continued)

OTHER PUBLICATIONS

Mokhatab, S. et al. (2012) Handbook of Natural Gas Transmission and Processing, 2nd ed., Gulf Professional Publishing, 828 pgs [Office action cites p. 196].*
(Continued)

*Primary Examiner* — Brian A McCaig
(74) *Attorney, Agent, or Firm* — Dinsmore & Shohl LLP

(57) ABSTRACT

According to one embodiment, a heavy oil may be processed by a method that may include upgrading at least a portion of the heavy oil to form an upgraded oil, where the upgrading comprises contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil. The method may further include passing at least a portion of the upgraded oil to a separation device that separates the upgraded oil into one or more transportation fuels; and where the final boiling point of the upgraded oil is less than or equal to 540° C.

22 Claims, 5 Drawing Sheets

(51) Int. Cl.
*C10G 47/20* (2006.01)
*C10G 45/08* (2006.01)
*C10G 69/04* (2006.01)
*C10G 53/02* (2006.01)
*C10G 57/00* (2006.01)
*C10G 65/10* (2006.01)
*C10G 69/02* (2006.01)
*C10G 69/06* (2006.01)
*C10G 65/12* (2006.01)

(52) U.S. Cl.
CPC ............ *C10G 53/02* (2013.01); *C10G 57/00* (2013.01); *C10G 65/10* (2013.01); *C10G 65/12* (2013.01); *C10G 69/02* (2013.01); *C10G 69/04* (2013.01); *C10G 69/06* (2013.01); *C10G 2300/202* (2013.01); *C10G 2300/205* (2013.01); *C10G 2300/308* (2013.01); *C10G 2400/02* (2013.01); *C10G 2400/04* (2013.01)

(58) Field of Classification Search
CPC ........ C10G 67/02; C10G 69/02; C10G 69/04; C10G 69/06
See application file for complete search history.

(56) References Cited

U.S. PATENT DOCUMENTS

| | | | |
|---|---|---|---|
| 3,730,879 A | 5/1973 | Christman et al. | |
| 3,755,143 A | 8/1973 | Hosoi et al. | |
| 3,830,720 A | 8/1974 | Misaki et al. | |
| 3,856,659 A | 12/1974 | Owen | |
| 3,862,838 A | 1/1975 | Sloboda | |
| 3,862,898 A | 1/1975 | Boyd et al. | |
| 3,876,523 A | 4/1975 | Rosinski | |
| 4,016,067 A | 4/1977 | Fischer et al. | |
| 4,133,777 A | 1/1979 | Frayer et al. | |
| 4,134,824 A | 1/1979 | Kamm et al. | |
| 4,153,539 A | 5/1979 | Herrington et al. | |
| 4,264,435 A | 4/1981 | Read et al. | |
| 4,297,203 A | 10/1981 | Ford et al. | |
| 4,436,706 A | 3/1984 | Nacken et al. | |
| 4,527,003 A | 7/1985 | Okamoto et al. | |
| 4,587,011 A | 5/1986 | Okamoto et al. | |
| 4,655,904 A | 4/1987 | Okamoto et al. | |
| 4,725,349 A | 2/1988 | Okamoto et al. | |
| 4,830,728 A | 5/1989 | Herbst et al. | |
| 4,992,160 A | 2/1991 | Long et al. | |
| 5,019,240 A | 5/1991 | Best et al. | |
| 5,171,331 A | 12/1992 | Debras et al. | |
| 5,233,121 A | 8/1993 | Modica | |
| 5,435,907 A | 7/1995 | Sudhakar et al. | |
| 5,523,502 A | 6/1996 | Rubin | |
| 5,603,824 A | 2/1997 | Kyan et al. | |
| 5,871,650 A | 2/1999 | Lai et al. | |
| 5,904,837 A | 5/1999 | Fujiyama | |
| 5,906,728 A | 5/1999 | Iaccino et al. | |
| 5,951,850 A | 9/1999 | Ino et al. | |
| 5,954,947 A | 9/1999 | Mignard et al. | |
| 5,958,365 A | 9/1999 | Liu | |
| 6,033,555 A | 3/2000 | Chen et al. | |
| 6,123,830 A | 9/2000 | Gupta et al. | |
| 6,190,533 B1 | 2/2001 | Bradow et al. | |
| 6,190,538 B1 | 2/2001 | Gosselink et al. | |
| 6,210,562 B1 | 4/2001 | Xie et al. | |
| 6,316,674 B1 | 11/2001 | Kantam et al. | |
| 6,384,285 B1 | 5/2002 | Choudary et al. | |
| 6,656,346 B2 | 12/2003 | Ino et al. | |
| 6,743,961 B2 | 6/2004 | Powers | |
| 6,811,684 B2 | 11/2004 | Mohr et al. | |
| 6,979,757 B2 | 12/2005 | Powers | |
| 6,982,074 B2 | 1/2006 | Jan et al. | |
| 7,019,187 B2 | 3/2006 | Powers | |
| 7,094,333 B2 | 8/2006 | Yang et al. | |
| 7,374,664 B2 | 5/2008 | Powers | |
| 7,396,449 B2 | 7/2008 | Powers | |
| 7,404,889 B1 | 7/2008 | Powers | |
| 7,419,584 B2 | 9/2008 | Stell et al. | |
| 7,550,642 B2 | 6/2009 | Powers | |
| 7,744,747 B2 | 6/2010 | Halsey | |
| 7,785,563 B2 | 8/2010 | Ryoo et al. | |
| 7,858,834 B2 | 12/2010 | Powers | |
| 7,972,498 B2 | 7/2011 | Buchanan et al. | |
| 8,658,019 B2 | 2/2014 | Bridges et al. | |
| 9,096,806 B2 | 8/2015 | Abba et al. | |
| 9,228,139 B2 | 1/2016 | Shafi et al. | |
| 9,228,140 B2 | 1/2016 | Abba et al. | |
| 9,228,141 B2 | 1/2016 | Sayed et al. | |
| 9,255,230 B2 | 2/2016 | Shafi et al. | |
| 9,279,088 B2 | 3/2016 | Shafi et al. | |
| 9,284,497 B2 | 3/2016 | Bourane et al. | |
| 9,284,501 B2 | 3/2016 | Sayed et al. | |
| 9,284,502 B2 | 3/2016 | Bourane et al. | |
| 9,296,961 B2 | 3/2016 | Shafi et al. | |
| 2005/0133405 A1 | 6/2005 | Wellington et al. | |
| 2006/0118462 A1 | 6/2006 | Schulze-Trautmann et al. | |
| 2006/0207917 A1 | 9/2006 | Domokos et al. | |
| 2006/0260981 A1 | 11/2006 | Gosling | |
| 2007/0090018 A1 | 4/2007 | Keusenkothen et al. | |
| 2007/0108100 A1 | 5/2007 | Satchell, Jr. | |
| 2007/0209968 A1 | 9/2007 | Euzen | |
| 2008/0277314 A1 | 11/2008 | Halsey | |
| 2008/0283445 A1 | 11/2008 | Powers | |
| 2009/0050523 A1 | 2/2009 | Halsey | |
| 2009/0218255 A1 | 9/2009 | Claude et al. | |
| 2009/0272674 A1 | 11/2009 | Zheng et al. | |
| 2010/0018904 A1 | 1/2010 | Kressmann et al. | |
| 2010/0025293 A1* | 2/2010 | Kressmann | B01J 35/1061 208/97 |
| 2010/0155293 A1 | 6/2010 | Verstraete et al. | |
| 2010/0230323 A1 | 9/2010 | Ancheyta Juárez et al. | |
| 2011/0083996 A1 | 4/2011 | Shafi et al. | |
| 2012/0061294 A1* | 3/2012 | Choi | C10G 47/32 208/97 |
| 2012/0279728 A1 | 11/2012 | Northrop et al. | |
| 2013/0197285 A1 | 8/2013 | Shafi et al. | |
| 2013/0220884 A1 | 8/2013 | Bourane et al. | |
| 2013/0248416 A1 | 9/2013 | Shafi et al. | |
| 2013/0248417 A1 | 9/2013 | Sayed et al. | |
| 2013/0248419 A1 | 9/2013 | Abba et al. | |
| 2013/0292299 A1* | 11/2013 | Koseoglu | C10G 65/12 208/97 |
| 2014/0221712 A1 | 8/2014 | Greene et al. | |
| 2015/0001130 A1 | 1/2015 | Akhras et al. | |
| 2016/0369185 A1 | 12/2016 | Ward et al. | |
| 2018/0147567 A1 | 5/2018 | Matsushita et al. | |

FOREIGN PATENT DOCUMENTS

| | | |
|---|---|---|
| GB | 978576 A | 12/1964 |
| JP | H06277439 A | 10/1994 |
| WO | 2015000847 A1 | 1/2015 |
| WO | 2015128040 A1 | 9/2015 |
| WO | 2015128041 A1 | 9/2015 |
| WO | 2016059569 A1 | 4/2016 |

OTHER PUBLICATIONS

Examination Report dated Mar. 12, 2019 pertaining to GCC Patent Application No. 2017/33869, filed Aug. 23, 2017, 4 pages.
Baric, John, "Next-Level Hydrocracker Flexibility: Unlocking High Performance in Today's Turbulent Markets", Shell Global Solutions, 2016, 3-18.
Ding et al., "LCO Hydrotreating with Mo—Ni and W—Ni Supported on Nano- and Micro-Sized Zeolite Beta", Applied Catalysis A: General, 2009, 353 17-23.
Garcia-Martinez et al., "Mesostructured Zeolite Y-High Hydrothermal Stability and Superior FCC Catalytic Performance", Catal. Sci. Technol., 2012, 2, 987-994.
International Search Report and Written Opinion pertaining to PCT/US2017/026498 dated Jun. 30, 2017.

(56) References Cited

OTHER PUBLICATIONS

International Search Report and Written Opinion pertaining to PCT/US2017/035202 dated Aug. 7, 2017.
International Search Report and Written Opinion pertaining to PCT/US2017/048130 dated Oct. 18, 2017.
Liu et al., "Y/MCM-41 Composites Assembled from Nanocrystals", Microporous and Mesoporous Materials, 2013, 181, 116-122.
Varoshiotis, Andy, "Cyprus New Energy Economy Focus Should be in the Petrochemicals", 2015, Linkedin.
Zhang et al., "Preparation and Characterization of Beta/MCM-41 Composite Zeolite with a Stepwise-Distributed Pore Structure", Powder Technology, 2008, 73-78.
Office Action pertaining to U.S. Appl. No. 15/683,071 dated Sep. 6, 2018.
International Search Report and Written Opinion pertaining to PCT/US2018/028592 dated Jun. 27, 2018.
Penrose et al., "Enhancing Refinery Profitability by Gasification, Hydroprocessing & Power Generation", Gasification Technologies Conference, Oct. 199, San Francisco CA, Texaco Power & Gasification.
Examination Report dated Apr. 15, 2019 pertaining to GCC Patent Application No. 2017/33195, filed Apr. 11, 2017, 5 pages.
Examination Report dated Apr. 2, 2019 pertaining to GCC Patent Application No. 2017/33492, filed Jun. 1, 2017, 5 pages.
U.S. Office Action dated Jun. 27, 2019 pertaining to U.S. Appl. No. 15/944,068, filed Apr. 3, 2018, 50 pgs.
Rana et al., "A Review of Recent Advances on Process Technologies for Upgrading of Heavy Oils and Residua", Fuel, 2007, 86, 1216-1231.
International Search Report and Written Opinion pertaining to PCT/US2018/042016 dated Oct. 8, 2018.
International Search Report and Written Opinion pertaining to PCT/US2018/042020 dated Oct. 8, 2018.
Examination Report dated Dec. 31, 2018 pertaining to GCC Patent Application No. GC 2017/33492, 6 pages.
International Search Report and Written Opinion pertaining to International Application No. PCT/US2018/042011 dated Jan. 2, 2019, 20 pages.
International Search Report and Written Opinion pertaining to International Application No. PCT/US2018/042015 dated Jan. 2, 2019, 20 pages.
U.S. Office Action dated Mar. 12, 2019 pertaining to U.S. Appl. No. 15/480,917, filed Apr. 6, 2017, 46 pgs.
U.S. Office Action dated Apr. 2, 2019 pertaining to U.S. Appl. No. 15/605,575, filed May 25, 2017, 52 pgs.
Notice of Allowance and Fee(s) Due dated Nov. 20, 2019 pertaining to U.S. Appl. No. 15/480,917, filed Apr. 6, 2017, 13 pgs.
Office Action dated Nov. 7, 2019 pertaining to U.S. Appl. No. 15/605,575, filed May 25, 2017, 39 pgs.
Notice of Allowance and Fee(s) Due dated Jan. 13, 2020 pertaining to U.S. Appl. No. 15/944,068, filed Apr. 3, 2018, 8 pgs.
Office Action dated Jul. 30, 2019 pertaining to U.S. Appl. No. 15/480,917, filed Apr. 6, 2017, 30 pgs.
Office Action dated Sep. 17, 2019 pertaining to U.S. Appl. No. 16/036,319, filed Jul. 16, 2018, 49 pgs.
Office Action dated Sep. 12, 2019 pertaining to U.S. Appl. No. 16/036,260, filed Jul. 16, 2018, 48 pgs.
Examination Report dated Jan. 29, 2020 which pertains to GCC Patent Application No. 2018/35655 with a filing date of Jul. 17, 2018, 5 pages.
Notice of Allowance dated Feb. 19, 2020, pertaining U.S. Appl. No. 16/036,260, 17 pages.
Notice of Allowance dated Feb. 20, 2020, pertaining U.S. Appl. No. 16/036,319, 18 pages.

\* cited by examiner

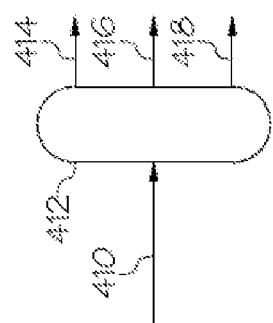

SYSTEMS AND METHODS FOR PROCESSING HEAVY OILS BY OIL UPGRADING FOLLOWED BY DISTILLATION

CROSS-REFERENCE TO RELATED APPLICATIONS

This application claims priority to U.S. Provisional Patent Application No. 62/533,416 filed Jul. 17, 2017, and entitled "SYSTEMS AND METHODS FOR PROCESSING HEAVY OILS," the entire contents of which are incorporated by reference.

BACKGROUND

Field

The present disclosure relates to processes and apparatuses for the processing of petroleum based feeds. More specifically, embodiments of the present disclosure relate to the processing of heavy oils, including crude oils, to form chemical products and intermediaries.

Technical Background

Petrochemical feeds, such as crude oils, can be converted to chemical intermediates such as ethylene, propylene, butenes, butadiene, and aromatic compounds such as benzene, toluene, and xylene, which are basic intermediates for a large portion of the petrochemical industry. They are mainly obtained through the thermal cracking (sometimes referred to as "steam pyrolysis" or "steam cracking") of petroleum gases and distillates such as naphtha, kerosene, or even gas oil. Additionally, petrochemical feeds may be converted to transportation fuels such a gasoline, diesel, et cetera. However, as demands rise for these basic intermediate compounds and fuels, other production methods must be considered beyond traditional refining operations.

BRIEF SUMMARY

There is a need for processes that produce transportation fuels from heavy oil feeds, such as crude oil. In one or more embodiments, catalytic treatment processes (sometimes referred to herein as pretreating, hydroprocessing, or hydrotreating) and catalysts for use in such processes are disclosed. In one or more embodiments, the catalysts have enhanced catalytic functionality and, in particular, have enhanced aromatic cracking functionality, and through such catalytic treatment processes, heavy oils may be upgraded and converted to at least transportation fuels by subsequent separation. The separation, such as by distillation, may be performed without any intermediate steps which reduce the final boiling point of the upgraded oil.

The presently-described catalytic treatment processes (for example, the upgrading) may have enhanced catalytic functionality with regards to reducing at least aromatic content, metal content, and nitrogen content in a crude oil feedstock, which may be subsequently refined into desired petrochemical products by a number of different processes disclosed herein. According to one or more embodiments, heavy oils may be treated by four catalysts arranged in series, where the primary function of the first catalyst (that is, the hydrodemetalization catalyst) is to remove metals from the heavy oil, the primary function of the second catalyst (that is, the transition catalyst) is to remove metals, sulfur, and nitrogen from the heavy oil and to provide a transition area between the first and third catalysts, the primary function of the third catalyst (as the hydrodenitrogenation catalyst) is to further remove nitrogen, sulfur, or both, and saturate the aromatics from the heavy oil, and the primary function of the fourth catalyst (that is, the hydrocracking catalyst) is to reduce aromatic content in the heavy oil. The overall pretreatment process may result in one or more of an increased concentration of paraffins, a decreased concentration of polynuclear aromatic hydrocarbons, and a reduced final boiling point of the pretreated oil with respect to the heavy oil feedstock.

Following the hydroprocessing, the upgraded heavy oil may be further processed by distillation into at least one or more transportation fuels. For example, the upgraded heavy oil may be directly passed to a separation unit for processing. In additional embodiments, some intermediate steps may be present, but the most heavy portion of the upgraded heavy oil may be retained in the stream that is passed to the separation device.

According to one embodiment, a heavy oil may be processed by a method that may include upgrading at least a portion of the heavy oil to form an upgraded oil, where the upgrading comprises contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil. The method may further comprise passing at least a portion of the upgraded oil to a separation device that separates the upgraded oil into one or more transportation fuels; and where the final boiling point of the upgraded oil is less than or equal to 540° C.

According to another embodiment, a heavy oil may be processed by a method that may include upgrading at least a portion of the heavy oil to form an upgraded oil, where the upgrading comprises contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil. The method may further comprise passing at least a portion of the upgraded oil to a separation device that separates the upgraded oil into one or more transportation fuels; and where at least the heaviest components of the upgraded oil are passed to the separation device.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 5 depicts a generalized diagram of a chemical processing system utilized subsequent to the chemical pretreatment system where the upgraded heavy oil is directly introduced to a distillation column to recover transport fuels, according to one or more embodiments described in this disclosure.

Figure 1:
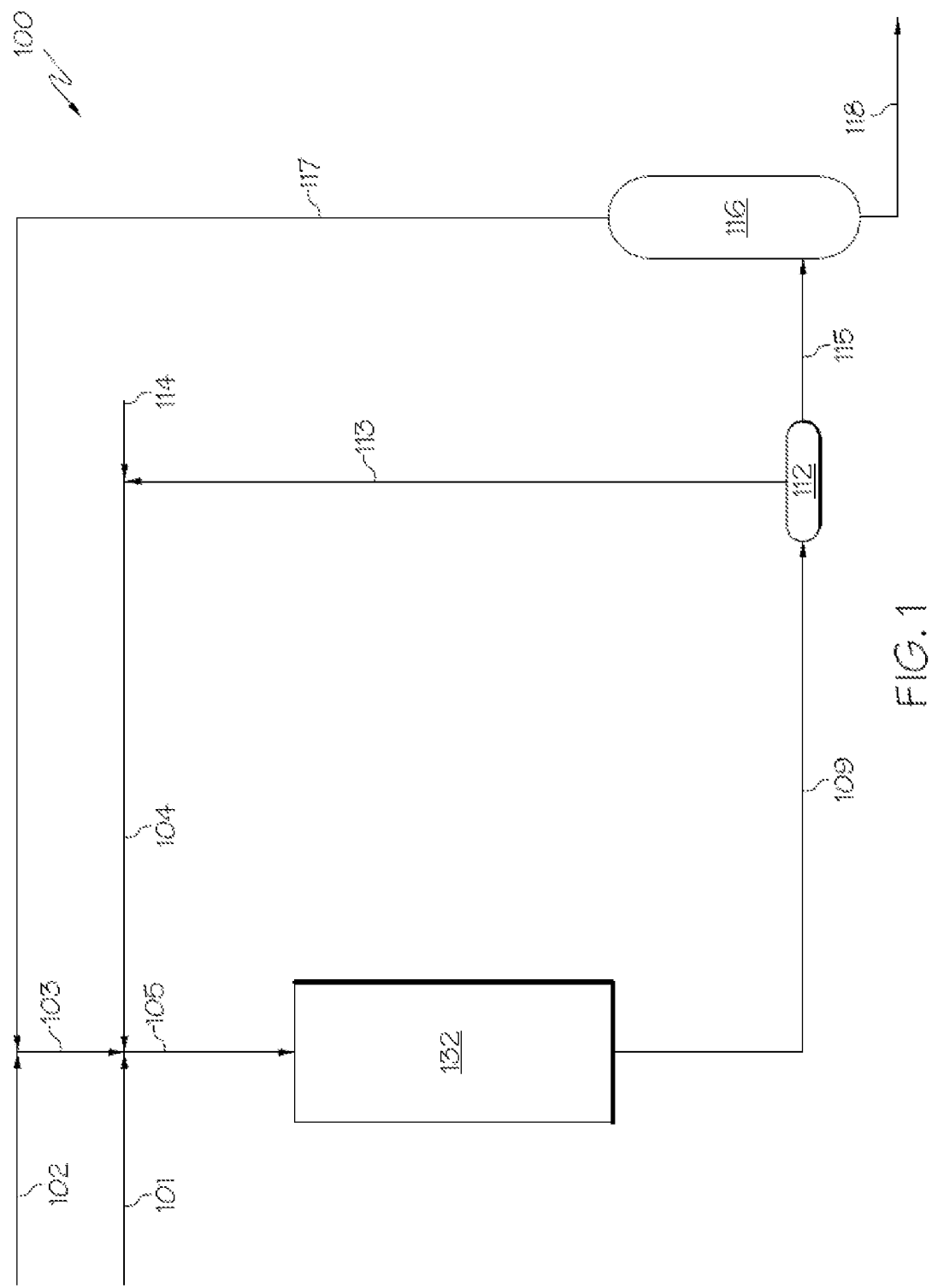
FIG. 1 depicts a generalized diagram of a chemical pretreatment system, according to one or more embodiments described in this disclosure.

For the purpose of the simplified schematic illustrations and descriptions of FIGS. 1-5, the numerous valves, temperature sensors, electronic controllers and the like that may be employed and are well known to those of ordinary skill in the art of certain chemical processing operations are not included. Further, accompanying components that are often included in conventional chemical processing operations, such as refineries, such as, for example, air supplies, catalyst hoppers, and flue gas handling are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which may exit the depicted system or a system inlet stream which may enter the depicted system. Product streams may be further processed in accompanying chemical processing systems or may be commercialized as end products. System inlet streams may be streams transferred from accompanying chemical processing systems or may be non-processed feedstock streams. Additionally, dashed or dotted lines may signify an optional step or stream. For example, recycle streams in a system may be optional. However, it should be appreciated that not all solid lines may represent required transfer lines or chemical streams.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Generally, described in this disclosure are various embodiments of systems and methods for processing heavy oils such as crude oil. According to one or more embodiments, the heavy oil processing may include an upgrading process followed by downstream separation into transportation fuels. Generally, the upgrading process may remove one or more of at least a portion of nitrogen, sulfur, and one or more metals from the heavy oil, and may additionally break aromatic moieties in the heavy oil. According to one or more embodiments, the heavy oil may be treated with a hydrodemetalization catalyst (referred to sometimes in this disclosure as an "HDM catalyst"), a transition catalyst, a hydrodenitrogenation catalyst (referred to sometimes in this disclosure as an "HDN catalyst"), and a hydrocracking catalyst. The HDM catalyst, transition catalyst, HDN catalyst, and hydrocracking catalyst may be positioned in series, either contained in a single reactor, such as a packed bed reactor with multiple beds, or contained in two or more reactors arranged in series.

Embodiments of the pretreatment process, as well as other processes following the pretreatment process, are described herein. The systems utilized following the pretreatment may be referred to as a "chemical processing system," or alternatively as a "post-pretreatment process" or "downstream processing." It should be understood that any of the disclosed chemical processing systems may be practiced in conjunction with any of the pretreatment processes described herein. For example, FIGS. 1-4 depict embodiments of pretreatment processing, and FIG. 5 depicts embodiments of chemical processing systems (i.e., post-pretreatment processing) by separation. It should be appreciated that any of the embodiments of the pretreatment systems, such as those depicted in FIGS. 1-4 or described with respect to FIGS. 1-4, may be utilized with any of the downstream processing configurations described herein, such as those of FIG. 5, or any other processing configuration described with respect to FIG. 5.

As used in this disclosure, a "reactor" refers to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device that at least partially separates one or more chemicals that are mixed in a process stream from one another. For example, a separation unit may selectively separate differing chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition. Further, in some separation processes, a "light fraction" and a "heavy fraction" may separately exit the separation unit. In general, the light fraction stream has a lesser boiling point than the heavy fraction stream. It should be additionally understood that where only one separation unit is depicted in a figure or described, two or more separation units may be employed to carry out the identical or substantially identical separation. For example, where a distillation column with multiple outlets is described, it is contemplated that several separators arranged in series may equally separate the feed stream and such embodiments are within the scope of the presently described embodiments.

It should be understood that a "reaction effluent" generally refers to a stream that exits a separation unit, a reactor, or reaction zone following a particular reaction or separation. Generally, a reaction effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent enters the downstream system unit.

As used in this disclosure, a "catalyst" refers to any substance which increases the rate of a specific chemical reaction. Catalysts described in this disclosure may be utilized to promote various reactions, such as, but not limited to, hydrodemetalization, hydrodesulfurization, hydrodenitrogenation, hydrodearomatization, aromatic cracking, or combinations thereof. As used in this disclosure, "cracking" generally refers to a chemical reaction where a molecule having carbon-carbon bonds is broken into more than one molecule by the breaking of one or more of the carbon-carbon bonds; where a compound including a cyclic moiety, such as an aromatic, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality.

It should be understood that two or more process streams are "mixed" or "combined" when two or more lines intersect in the schematic flow diagrams of FIGS. 1-5. Mixing or combining may also include mixing by directly introducing both streams into a like reactor, separation unit, or other system component.

It should be understood that the reactions promoted by catalysts as described in this disclosure may remove a chemical constituent, such as only a portion of a chemical constituent, from a process stream. For example, a hydrodemetalization (HDM) catalyst may be present in an effective amount to promote a reaction that removes a portion of one or more metals from a process stream. A hydrodenitrogenation (HDN) catalyst may be present in an effective amount to promote a reaction that removes a portion of the nitrogen present in a process stream. A hydrodesulfurization (HDS) catalyst may present in an effective amount to promote a reaction that removes a portion of the sulfur present in a process stream. Additionally, a hydrocracking catalyst, such as a hydrodearomatization (HDA) catalyst, may present in an effective amount to promote a reaction that reduces the amount of aromatic moieties in a process stream by saturating and cracking those aromatic moieties. It should be understood that, throughout this disclosure, a particular catalyst is not necessarily limited in functionality to the removal or cracking of a particular chemical constituent or moiety when it is referred to as having a particular functionality. For example, a catalyst identified in this disclosure as an HDN catalyst may additionally provide HDA functionality, HDS functionality, or both.

It should further be understood that streams may be named for the components of the stream, and the component for which the stream is named may be the major component of the stream (such as comprising from 50 weight percent (wt. %), from 70 wt. %, from 90 wt. %, from 95 wt. %, or even from 95 wt. % of the contents of the stream to 100 wt. % of the contents of the stream).

It should be understood that pore size, as used throughout this disclosure, relates to the average pore size unless specified otherwise. The average pore size may be determined from a Brunauer-Emmett-Teller (BET) analysis. Further, the average pore size may be confirmed by transmission electron microscope (TEM) characterization.

Referring now to FIG. 1, a pretreatment system 100 is depicted which includes a generalized hydrotreatment catalyst system 132. It should be understood that additional embodiments of the hydrotreatment catalyst system 132 of FIG. 1 are described in detail in FIGS. 2-4. However, it should be understood that the feedstocks, products, recycle streams, et cetera, of the generalized pretreatment system 100 of FIG. 1 apply also to embodiments described with respect to FIGS. 2-4.

Referring to FIG. 1, according to embodiments of this disclosure, a heavy oil feed stream 101 may be mixed with a hydrogen stream 104. The hydrogen stream 104 may comprise unspent hydrogen gas from recycled process gas component stream 113, make-up hydrogen from hydrogen feed stream 114, or both, to mix with heavy oil feed stream 101 and form a pretreatment catalyst input stream 105. In one or more embodiments, pretreatment catalyst input stream 105 may be heated to a process temperature of from 350 degrees Celsius (° C.) to 450° C. The pretreatment catalyst input stream 105 may enter and pass through the hydrotreatment catalyst system 132. As is described herein, the hydrotreatment catalyst system 132 may include a series of reaction zones, including a HDM reaction zone, a transition reaction zone, a HDN reaction zone, and a hydrocracking reaction zone.

The systems and processes described are applicable for a wide variety of heavy oil feeds (in heavy oil feed stream 101), including crude oils, vacuum residue, tar sands, bitumen and vacuum gas oils using a catalytic hydrotreating pretreatment process. If the heavy oil feed is crude oil, it may have an American Petroleum Institute (API) gravity of from 25 degrees to 50 degrees. For example, the heavy oil feed utilized may be Arab Heavy crude oil. The typical properties for an Arab Heavy crude oil are shown in Table 1.

TABLE 1

| Arab Heavy Export Feedstock | | |
|---|---|---|
| Analysis | Units | Value |
| American Petroleum Institute (API) gravity | degree | 27 |

TABLE 1-continued

Arab Heavy Export Feedstock

| Analysis | Units | Value |
|---|---|---|
| Density | grams per cubic centimeter (g/cm$^3$) | 0.8904 |
| Sulfur Content | Weight percent (wt.%) | 2.83 |
| Nickel | Parts per million by weight (ppmw) | 16.4 |
| Vanadium | ppmw | 56.4 |
| NaCl Content | ppmw | <5 |
| Conradson Carbon Residue (CCR) | wt. % | 8.2 |
| C5 Asphaltenes | wt. % | 7.8 |
| C7 Asphaltenes | wt. % | 4.2 |

Still referring to FIG. 1, a pretreatment catalyst reaction effluent stream 109 may be formed by interaction of the pretreatment catalyst input stream 105 with hydrotreatment catalyst system 132. The pretreatment catalyst reaction effluent stream 109 may enter a separation unit 112 and may be separated into recycled process gas component stream 113 and intermediate liquid product stream 115. In one embodiment, the pretreatment catalyst reaction effluent stream 109 may also be purified to remove hydrogen sulfide and other process gases to increase the purity of the hydrogen to be recycled in recycled process gas component stream 113. The hydrogen consumed in the process can be compensated for by the addition of a fresh hydrogen from make-up hydrogen feed stream 114, which may be derived from a steam or naphtha reformer or other source. Recycled process gas component stream 113 and fresh make-up hydrogen feed stream 114 may combine to form hydrogen stream 104. In one embodiment, intermediate liquid product stream 115 may be separated in separation unit 116 to separate light hydrocarbon fraction stream 117 and pretreatment final liquid product stream 118; however, it should be understood that this separation step is optional. In further embodiments, separation unit 116 may be a flash vessel. In one embodiment, light hydrocarbon fraction stream 117 acts as a recycle and is mixed with fresh light hydrocarbon diluent stream 102 to create light hydrocarbon diluent stream 103. Fresh light hydrocarbon diluent stream 102 can be used as needed to provide make-up diluent to help further reduce the deactivation of one or more of the catalysts in the hydrotreatment catalyst system 132.

In one or more embodiments, one or more of the pretreatment catalyst reaction effluent stream 109, the intermediate liquid product stream 115, and the pretreatment final liquid product stream 118 may have reduced aromatic content as compared with the heavy oil feed stream 101. Additionally, in embodiments, one or more of the pretreatment catalyst reaction effluent stream 109, the intermediate liquid product stream 115, and the pretreatment final liquid product stream 118 may have reduced sulfur, metal, asphaltenes, Conradson carbon, nitrogen content, or combinations thereof, as well as an increased API gravity and increased diesel and vacuum distillate yields as compared with the heavy oil feed stream 101.

According to one or more embodiments, the pretreatment catalyst reaction effluent stream 109 may have a reduction of at least about 80 wt. %, a reduction of at least 90 wt. %, or even a reduction of at least 95 wt. % of nitrogen with respect to the heavy oil feed stream 101. According to another embodiment, the pretreatment catalyst reaction effluent stream 109 may have a reduction of at least about 85 wt. %, a reduction of at least 90 wt. %, or even a reduction of at least 99 wt. % of sulfur with respect to the heavy oil feed stream 101. According to another embodiment, the pretreatment catalyst reaction effluent stream 109 may have a reduction of at least about 70 wt. %, a reduction of at least 80 wt. %, or even a reduction of at least 85 wt. % of aromatic content with respect to the heavy oil feed stream 101. According to another embodiment, the pretreatment catalyst reaction effluent stream 109 may have a reduction of at least about 80 wt. %, a reduction of at least 90 wt. %, or even a reduction of at least 99 wt. % of metal with respect to the heavy oil feed stream 101.

Still referring to FIG. 1, in various embodiments, one or more of the pretreatment catalyst reaction effluent stream 109, the intermediate liquid product stream 115, and the pretreatment final liquid product stream 118 may be suitable for use as the separation input stream 410 of FIG. 5 as described subsequently in this disclosure. As used in this disclosure, one or more of the pretreatment catalyst reaction effluent stream 109, the intermediate liquid product stream 115, and the pretreatment final liquid product stream 118 may be referred to as an "upgraded oil" which may be downstream processed by the systems of at least FIG. 5. The upgraded oils, in some embodiments, may have a final boiling point of less than 540° C., which may increase efficiency of further conversion in downstream separation. In additional embodiments, at least 90 wt. %, at least 95 wt. %, or even at least 99 wt. % of the upgraded oil may have a boiling point of less than or equal to 540° C. In additional embodiments, the upgraded oil may have a final boiling point of less than or equal to 520° C., 500° C., 480° C., 460° C., 440° C., 420° C., 400° C., 380° C., 360° C., 340° C., 320° C., or even 300° C. It should be understood that the final boiling point of the upgraded oil is equal to the final boiling point of the pretreatment reaction catalyst effluent stream 109 because only light fractions are removed by subsequent, optional separation steps in pretreatment system 100.

Figure 2:
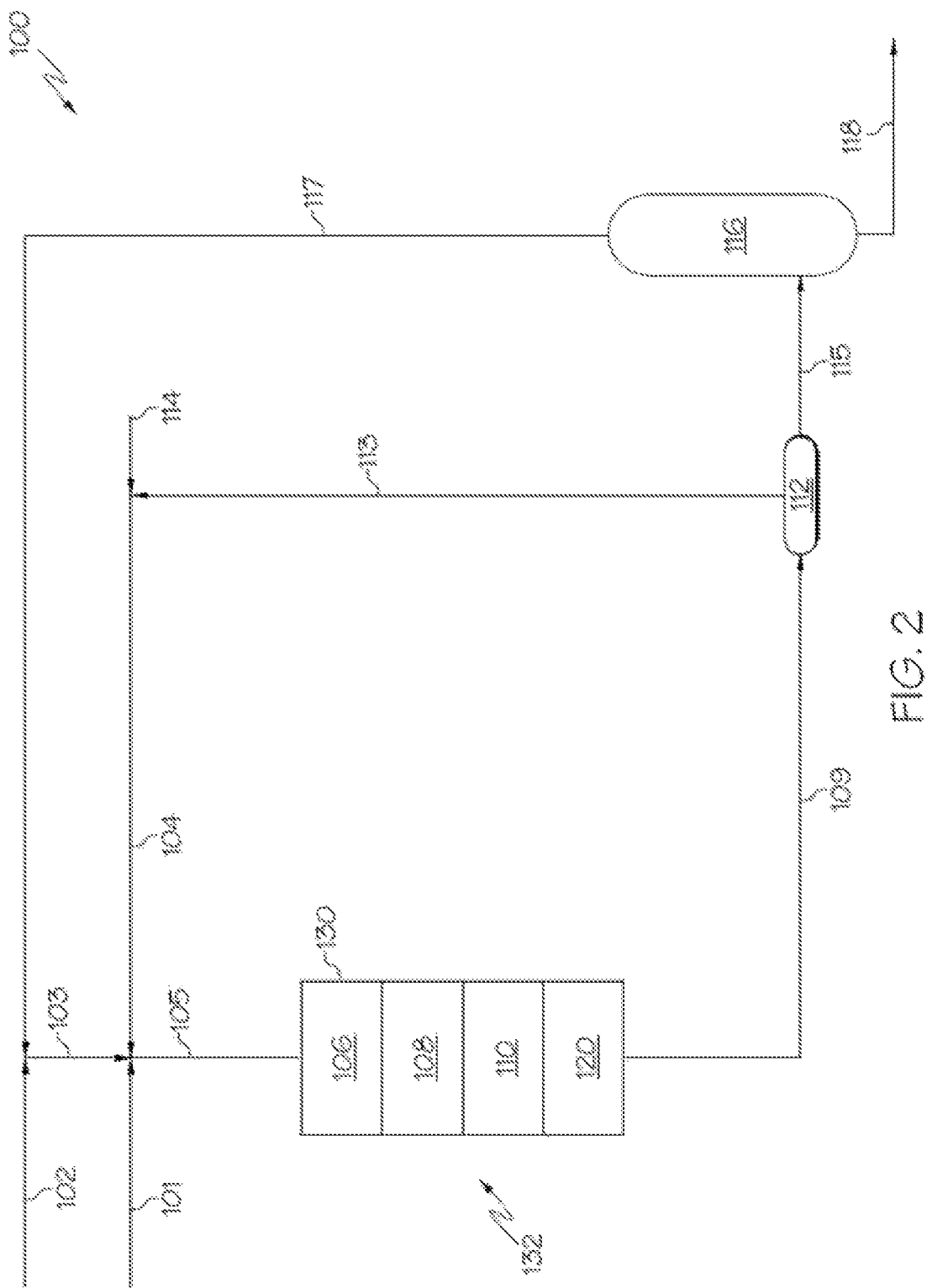
FIG. 2 depicts a generalized diagram of a chemical pretreatment system which includes a hydrodemetalization (HDM) catalyst, a transition catalyst, a hydrodenitrogenation (HDN) catalyst, and a hydrocracking catalyst, according to one or more embodiments described in this disclosure.

Referring now to FIG. 2, according to one or more embodiments, the hydrotreatment catalyst system 132 may include or consist of multiple packed bed reaction zones arranged in series (for example, a HDM reaction zone 106, a transition reaction zone 108, a HDN reaction zone 110, and a hydrocracking reaction zone 120) and each of these reaction zones may comprise a catalyst bed. Each of these reaction zones may be contained in a single reactor as a packed bed reactor with multiple beds in series, as shown as a pretreatment reactor 130 in FIG. 2. In such embodiments, the pretreatment reactor 130 comprises an HDM catalyst bed comprising an HDM catalyst in the HDM reaction zone 106, a transition catalyst bed comprising a transition catalyst in the transition reaction zone 108, an HDN catalyst bed comprising an HDN catalyst in the HDN reaction zone 110, and a hydrocracking catalyst bed comprising a hydrocracking catalyst in the hydrocracking reaction zone 120. In other embodiments, the HDM reaction zone 106, transition reaction zone 108, HDN reaction zone 110, and hydrocracking reaction zone 120 may each be contained in a plurality of packed bed reactors arranged in series. In further embodiments, each reaction zone is contained in a separate, single packed bed reactor. It should be understood that contemplated embodiments include those where packed catalyst beds which are arranged in series are contained in a single reactor or in multiple reactors each containing one or more catalyst beds. It should be appreciated that when relatively large quantities of catalyst are needed, it may be desirable to house those catalysts in separate reactors.

According to one or more embodiments, the pretreatment catalyst input stream 105, which comprises heavy oil, is introduced to the HDM reaction zone 106 and is contacted by the HDM catalyst. Contacting the HDM catalyst with the pretreatment catalyst input stream 105 may promote a reaction that removes at least a portion of the metals present in the pretreatment catalyst input stream 105, such as a hydrodemetalization reaction. Following contact with the HDM catalyst, the pretreatment catalyst input stream 105 may be converted to an HDM reaction effluent. The HDM reaction effluent may have a reduced metal content as compared to the contents of the pretreatment catalyst input stream 105. For example, the HDM reaction effluent may have at least 70 wt. % less, at least 80 wt. % less, or even at least 95 wt. % less metal as the pretreatment catalyst input stream 105.

According to one or more embodiments, the HDM reaction zone 106 may have a weighted average bed temperature of from 350° C. to 450° C., such as from 370° C. to 415° C., and may have a pressure of from 30 bars to 200 bars, such as from 90 bars to 110 bars. The HDM reaction zone 106 comprises the HDM catalyst, and the HDM catalyst may fill the entirety of the HDM reaction zone 106.

The HDM catalyst may comprise one or more metals from the International Union of Pure and Applied Chemistry (IUPAC) Groups 5, 6, or 8-10 of the periodic table. For example, the HDM catalyst may comprise molybdenum. The HDM catalyst may further comprise a support material, and the metal may be disposed on the support material. In one embodiment, the HDM catalyst may comprise a molybdenum metal catalyst on an alumina support (sometimes referred to as "Mo/Al2O3 catalyst"). It should be understood throughout this disclosure that metals contained in any of the disclosed catalysts may be present as sulfides or oxides, or even other compounds.

In one embodiment, the HDM catalyst may include a metal sulfide on a support material, where the metal is selected from the group consisting of IUPAC Groups 5, 6, and 8-10 elements of the periodic table, and combinations thereof. The support material may be gamma-alumina or silica/alumina extrudates, spheres, cylinders, beads, pellets, and combinations thereof.

In one embodiment, the HDM catalyst may comprise a gamma-alumina support, with a surface area of from 100 m2/g to 160 m2/g (such as, from 100 m2/g to 130 m2/g, or from 130 m2/g to 160 m2/g). The HDM catalyst can be best described as having a relatively large pore volume, such as at least 0.8 cm3/g (for example, at least 0.9 cm3/g, or even at least 1.0 cm3/g). The pore size of the HDM catalyst may be predominantly macroporous (that is, having a pore size of greater than 50 nm). This may provide a large capacity for the uptake of metals on the HDM catalyst's surface and optionally dopants. In one embodiment, a dopant can be selected from the group consisting of boron, silicon, halogens, phosphorus, and combinations thereof.

In one or more embodiments, the HDM catalyst may comprise from 0.5 wt. % to 12 wt. % of an oxide or sulfide of molybdenum (such as from 2 wt. % to 10 wt. % or from 3 wt. % to 7 wt. % of an oxide or sulfide of molybdenum), and from 88 wt. % to 99.5 wt. % of alumina (such as from 90 wt. % to 98 wt. % or from 93 wt. % to 97 wt. % of alumina).

Without being bound by theory, in some embodiments, it is believed that during the reaction in the HDM reaction zone 106, the HDM catalyst promotes the hydrogenation of porphyrin type compounds present in the heavy oil via hydrogen to create an intermediate. Following this primary hydrogenation, the nickel or vanadium present in the center of the porphyrin molecule in the intermediate is reduced with hydrogen and then further reduced to the corresponding sulfide with hydrogen sulfide (H2S). The final metal sulfide is deposited on the HDM catalyst thus removing the metal sulfide from the virgin crude oil. Sulfur is also removed from sulfur-containing organic compounds through a parallel pathway. The rates of these parallel reactions may depend upon the sulfur species being considered. Overall, hydrogen is used to abstract the sulfur which is converted to H2S in the process. The remaining, sulfur-free hydrocarbon fragments remain in the liquid hydrocarbon stream.

The HDM reaction effluent may be passed from the HDM reaction zone 106 to the transition reaction zone 108 where it is contacted by the transition catalyst. Contact by the transition catalyst with the HDM reaction effluent may promote a reaction that removes at least a portion of the metals present in the HDM reaction effluent stream as well as reactions that may remove at least a portion of the nitrogen present in the HDM reaction effluent stream. Following contact with the transition catalyst, the HDM reaction effluent is converted to a transition reaction effluent. The transition reaction effluent may have a reduced metal content and nitrogen content as compared to the HDM reaction effluent. For example, the transition reaction effluent may have at least 50 wt. % less, at least 80 wt. % less, or even at least 90 wt. % less metal content as the HDM reaction effluent. Additionally, the transition reaction effluent may have at least 10 wt. % less, at least 15 wt. % less, or even at least 20 wt. % less nitrogen as the HDM reaction effluent.

According to embodiments, the transition reaction zone 108 has a weighted average bed temperature of about 370° C. to 410° C. The transition reaction zone 108 comprises the transition catalyst, and the transition catalyst may fill the entirety of the transition reaction zone 108.

In one embodiment, the transition reaction zone 108 may be operable to remove a quantity of metal components and a quantity of sulfur components from the HDM reaction effluent stream. The transition catalyst may comprise an alumina based support in the form of extrudates.

In one embodiment, the transition catalyst comprises one metal from IUPAC Group 6 and one metal from IUPAC Groups 8-10. Examples of IUPAC Group 6 metals include molybdenum and tungsten. Example IUPAC Group 8-10 metals include nickel and cobalt. For example, the transition catalyst may comprise Mo and Ni on a titania support (sometimes referred to as "Mo—Ni/Al2O3 catalyst"). The transition catalyst may also contain a dopant that is selected from the group consisting of boron, phosphorus, halogens, silicon, and combinations thereof. The transition catalyst can have a surface area of 140 m2/g to 200 m2/g (such as from 140 m2/g to 170 m2/g or from 170 m2/g to 200 m2/g). The transition catalyst can have an intermediate pore volume of from 0.5 cm3/g to 0.7 cm3/g (such as 0.6 cm3/g). The transition catalyst may generally comprise a mesoporous structure having pore sizes in the range of 12 nm to 50 nm. These characteristics provide a balanced activity in HDM and HDS.

In one or more embodiments, the transition catalyst may comprise from 10 wt. % to 18 wt. % of an oxide or sulfide of molybdenum (such as from 11 wt. % to 17 wt. % or from 12 wt. % to 16 wt. % of an oxide or sulfide of molybdenum), from 1 wt. % to 7 wt. % of an oxide or sulfide of nickel (such as from 2 wt. % to 6 wt. % or from 3 wt. % to 5 wt. % of an oxide or sulfide of nickel), and from 75 wt. % to 89 wt. % of alumina (such as from 77 wt. % to 87 wt. % or from 79 wt. % to 85 wt. % of alumina).

The transition reaction effluent may be passed from the transition reaction zone 108 to the HDN reaction zone 110 where it is contacted by the HDN catalyst. Contact by the HDN catalyst with the transition reaction effluent may promote a reaction that removes at least a portion of the nitrogen present in the transition reaction effluent stream, such as a hydrodenitrogenation reaction. Following contact with the HDN catalyst, the transition reaction effluent may be converted to an HDN reaction effluent. The HDN reaction effluent may have a reduced metal content and nitrogen content as compared to the transition reaction effluent. For example, the HDN reaction effluent may have a nitrogen content reduction of at least 80 wt. %, at least 85 wt. %, or even at least 90 wt. % relative to the transition reaction effluent. In another embodiment, the HDN reaction effluent may have a sulfur content reduction of at least 80 wt. %, at least 90 wt. %, or even at least 95 wt. % relative to the transition reaction effluent. In another embodiment, the HDN reaction effluent may have an aromatics content reduction of at least 25 wt. %, at least 30 wt. %, or even at least 40 wt. % relative to the transition reaction effluent.

According to embodiments, the HDN reaction zone 110 has a weighted average bed temperature of from 370° C. to 410° C. The HDN reaction zone 110 comprises the HDN catalyst, and the HDN catalyst may fill the entirety of the HDN reaction zone 110.

In one embodiment, the HDN catalyst includes a metal oxide or sulfide on a support material, where the metal is selected from the group consisting of IUPAC Groups 5, 6, and 8-10 of the periodic table, and combinations thereof. The support material may include gamma-alumina, mesoporous alumina, silica, or both, in the form of extrudates, spheres, cylinders and pellets.

According to one embodiment, the HDN catalyst contains a gamma alumina based support that has a surface area of 180 m2/g to 240 m2/g (such as from 180 m2/g to 210 m2/g, or from 210 m2/g to 240 m2/g). This relatively large surface area for the HDN catalyst allows for a smaller pore volume (for example, less than 1.0 cm3/g, less than 0.95 cm3/g, or even less than 0.9 cm3/g). In one embodiment, the HDN catalyst contains at least one metal from IUPAC Group 6, such as molybdenum and at least one metal from IUPAC Groups 8-10, such as nickel. The HDN catalyst can also include at least one dopant selected from the group consisting of boron, phosphorus, silicon, halogens, and combinations thereof. In one embodiment, the HDN catalyst may include cobalt, which further promotes desulfurization. In one embodiment, the HDN catalyst has a higher metals loading for the active phase as compared to the HDM catalyst. This increased metals loading may cause increased catalytic activity. In one embodiment, the HDN catalyst comprises nickel and molybdenum, and has a nickel to molybdenum mole ratio (Ni/(Ni+Mo)) of 0.1 to 0.3 (such as from 0.1 to 0.2 or from 0.2 to 0.3). In an embodiment that includes cobalt, the mole ratio of (Co+Ni)/Mo may be in the range of 0.25 to 0.85 (such as from 0.25 to 0.5 or from 0.5 to 0.85).

According to another embodiment, the HDN catalyst may contain a mesoporous material, such as mesoporous alumina, that may have an average pore size of at least 25 nm. For example, the HDN catalyst may comprise mesoporous alumina having an average pore size of at least 30 nm, or even at least 35 nm. HDN catalysts with relatively small average pore size, such as less than 2 nm, may be referred to as conventional HDN catalysts in this disclosure, and may have relatively poor catalytic performance as compared with the presently-disclosed HDN catalysts with larger-sized pores. Embodiments of HDN catalysts with an alumina support having an average pore size of from 2 nm to 50 nm may be referred to in this disclosure as "meso-porous alumina supported catalysts." In one or more embodiments, the mesoporous alumina of the HDM catalyst may have an average pore size in a range from 2 nm to 50 nm, 25 nm to 50 nm, from 30 nm to 50 nm, or from 35 nm to 50 nm. According to embodiments, the HDN catalyst may include alumina that has a relatively large surface area, a relatively large pore volume, or both. For example, the mesoporous alumina may have a relatively large surface area by having a surface area of at least about 225 m2/g, at least about 250 m2/g, at least about 275 m2/g, at least about 300 m2/g, or even at least about 350 m2/g, such as from 225 m2/g to 500 m2/g, from 200 m2/g to 450 m2/g, or from 300 m2/g to 400 m2/g. In one or more embodiments, the mesoporous alumina may have a relatively large pore volume by having a pore volume of at least about 1 mL/g, at least about 1.1 mL/g, at least 1.2 mL/g, or even at least 1.2 mL/g, such as from 1 mL/g to 5 mL/g, from 1.1 mL/g to 3, or from 1.2 mL/g to 2 mL/g. Without being bound by theory, it is believed that the meso-porous alumina supported HDN catalyst may provide additional active sites and larger pore channels that may facilitate larger molecules to be transferred into and out of the catalyst. The additional active sites and larger pore channels may result in higher catalytic activity, longer catalyst life, or both. In one embodiment, the HDN catalyst may include a dopant, which can be selected from the group consisting of boron, silicon, halogens, phosphorus, and combinations thereof.

According to embodiments described, the HDN catalyst may be produced by mixing a support material, such as alumina, with a binder, such as acid peptized alumina. Water or another solvent may be added to the mixture of support material and binder to form an extrudable phase, which is then extruded into a desired shape. The extrudate may be dried at an elevated temperature (such as above 100° C., such as 110° C.) and then calcined at a suitable temperature (such as at a temperature of at least 400° C. or at least 450° C., such as 500° C.). The calcined extrudates may be impregnated with an aqueous solution containing catalyst precursor materials, such as precursor materials that include Mo, Ni, or combinations thereof. For example, the aqueous solution may contain ammonium heptanmolybdate, nickel nitrate, and phosphoric acid to form an HDN catalyst comprising compounds comprising molybdenum, nickel, and phosphorous.

In embodiments where a meso-porous alumina support is utilized, the meso-porous alumina may be synthesized by dispersing boehmite powder in water at 60° C. to 90° C. Then, an acid such as HNO3 may be added to the boehmite in water solution at a ratio of HNO3:Al3+ of 0.3 to 3.0 and the solution is stirred at 60° C. to 90° C. for several hours, such as 6 hours, to obtain a sol. A copolymer, such as a triblock copolymer, may be added to the sol at room temperature, where the molar ratio of copolymer:Al is from 0.02 to 0.05 and aged for several hours, such as three hours. The sol/copolymer mixture is dried for several hours and then calcined.

According to one or more embodiments, the HDN catalyst may comprise from 10 wt. % to 18 wt. % of an oxide or sulfide of molybdenum (such as from 13 wt. % to 17 wt. % or from 14 wt. % to 16 wt. % of an oxide or sulfide of molybdenum), from 2 wt. % to 8 wt. % of an oxide or sulfide of nickel (such as from 3 wt. % to 7 wt. % or from 4 wt. % to 6 wt. % of an oxide or sulfide of nickel), and from 74 wt.

% to 88 wt. % of alumina (such as from 76 wt. % to 84 wt. % or from 78 wt. % to 82 wt. % of alumina).

In a similar manner to the HDM catalyst, and again not intending to be bound to any theory, it is believed that hydrodenitrogenation and hydrodearomatization may operate via related reaction mechanisms. Both involve some degree of hydrogenation. For the hydrodenitrogenation, organic nitrogen compounds are usually in the form of heterocyclic structures, the heteroatom being nitrogen. These heterocyclic structures may be saturated prior to the removal of the heteroatom of nitrogen. Similarly, hydrodearomatization involves the saturation of aromatic rings. Each of these reactions may occur to a differing extent depending on the amount or type of each catalyst because each catalyst may selectively promote one type of transfer over others and because the transfers are competing.

It should be understood that some embodiments of the presently described methods and systems may utilize HDN catalyst that include porous alumina having an average pore size of at least 25 nm. However, in other embodiments, the average pore size of the porous alumina may be less than about 25 nm, and may even be microporous (that is, having an average pore size of less than 2 nm).

Still referring to FIG. 2, the HDN reaction effluent may be passed from the HDN reaction zone 110 to the hydrocracking reaction zone 120 where it is contacted by the hydrocracking catalyst. Contact by the hydrocracking catalyst with the HDN reaction effluent may promote a reaction that reduces the aromatic content present in the HDN reaction effluent. Following contact with the hydrocracking catalyst, the HDN reaction effluent is converted to a pretreatment catalyst reaction effluent stream 109. The pretreatment catalyst reaction effluent stream 109 may have reduced aromatics content as compared to the HDN reaction effluent. For example, the pretreatment catalyst reaction effluent stream 109 may have at least 50 wt. % less, at least 60 wt. % less, or even at least 80 wt. % less aromatics content as the HDN reaction effluent.

The hydrocracking catalyst may comprise one or more metals from IUPAC Groups 5, 6, 8, 9, or 10 of the periodic table. For example, the hydrocracking catalyst may comprise one or more metals from IUPAC Groups 5 or 6, and one or more metals from IUPAC Groups 8, 9, or 10 of the periodic table. For example, the hydrocracking catalyst may comprise molybdenum or tungsten from IUPAC Group 6 and nickel or cobalt from IUPAC Groups 8, 9, or 10. The HDM catalyst may further comprise a support material, such as zeolite, and the metal may be disposed on the support material. In one embodiment, the hydrocracking catalyst may comprise tungsten and nickel metal catalyst on a zeolite support that is mesoporous (sometimes referred to as "W—Ni/meso-zeolite catalyst"). In another embodiment, the hydrocracking catalyst may comprise molybdenum and nickel metal catalyst on a zeolite support that is mesoporous (sometimes referred to as "Mo—Ni/meso-zeolite catalyst").

According to embodiments of the hydrocracking catalysts of the hydrotreatment catalytic systems described in this disclosure, the support material (that is, the mesoporous zeolite) may be characterized as mesoporous by having average pore size of from 2 nm to 50 nm. By way of comparison, conventional zeolite-based hydrocracking catalysts contain zeolites which are microporous, meaning that they have an average pore size of less than 2 nm. Without being bound by theory, it is believed that the relatively large sized pores (that is, mesoporosity) of the presently-described hydrocracking catalysts allow for larger molecules to diffuse inside the zeolite, which is believed to enhance the reaction activity and selectivity of the catalyst. Because of the increased pore size, aromatic-containing molecules can more easily diffuse into the catalyst, and aromatic cracking may increase. For example, in some conventional embodiments, the feedstock converted by the hydroprocessing catalysts may be vacuum gas oils; light cycle oils from, for example, a fluid catalytic cracking reactor; or coker gas oils from, for example, a coking unit. The molecular sizes in these oils are relatively small compared to those of heavy oils such as crude and atmosphere residue, which may be the feedstock of the present methods and systems. The heavy oils generally are inable to diffuse inside the conventional zeolites and be converted on the active sites located inside the zeolites. Therefore, zeolites with larger pore sizes (that is, mesoporous zeolites) may allow the larger molecules of heavy oils to overcome the diffusion limitation and may promote the reaction and conversion of the larger molecules of the heavy oils.

The zeolite support material is not necessarily limited to a particular type of zeolite. However, it is contemplated that zeolites such as Y, Beta, AWLZ-15, LZ-45, Y-82, Y-84, LZ-210, LZ-25, Silicalite, or mordenite may be suitable for use in the presently-described hydrocracking catalyst. For example, suitable mesoporous zeolites that can be impregnated with one or more catalytic metals such as W, Ni, Mo, or combinations thereof, are described in at least U.S. Pat. No. 7,785,563; Zhang et al., Powder Technology 183 (2008) 73-78; Liu et al., Microporous and Mesoporous Materials 181 (2013) 116-122; and Garcia-Martinez et al., Catalysis Science & Technology, 2012 (DOI: 10.1039/c2cy00309k).

In one or more embodiments, the hydrocracking catalyst may comprise from 18 wt. % to 28 wt. % of a sulfide or oxide of tungsten (such as from 20 wt. % to 27 wt. % or from 22 wt. % to 26 wt. % of tungsten or a sulfide or oxide of tungsten), from 2 wt. % to 8 wt. % of an oxide or sulfide of nickel (such as from 3 wt. % to 7 wt. % or from 4 wt. % to 6 wt. % of an oxide or sulfide of nickel), and from 5 wt. % to 40 wt. % of mesoporous zeolite (such as from 10 wt. % to 35 wt. % or from 10 wt. % to 30 wt. % of zeolite). In another embodiment, the hydrocracking catalyst may comprise from 12 wt. % to 18 wt. % of an oxide or sulfide of molybdenum (such as from 13 wt. % to 17 wt. % or from 14 wt. % to 16 wt. % of an oxide or sulfide of molybdenum), from 2 wt. % to 8 wt. % of an oxide or sulfide of nickel (such as from 3 wt. % to 7 wt. % or from 4 wt. % to 6 wt. % of an oxide or sulfide of nickel), and from 5 wt. % to 40 wt. % of mesoporous zeolite (such as from 10 wt. % to 35 wt. % or from 10 wt. % to 30 wt. % of mesoporous zeolite).

The hydrocracking catalysts described may be prepared by selecting a mesoporous zeolite and impregnating the mesoporous zeolite with one or more catalytic metals or by comulling mesoporous zeolite with other components. For the impregnation method, the mesoporous zeolite, active alumina (for example, boehmite alumina), and binder (for example, acid peptized alumina) may be mixed. An appropriate amount of water may be added to form a dough that can be extruded using an extruder. The extrudate may be dried at from 80° C. to 120° C. for from 4 hours to 10 hours and then calcinated at from 500° C. to 550° C. for from 4 hours to 6 hours. The calcinated extrudate may be impregnated with an aqueous solution prepared with compounds comprising Ni, W, Mo, Co, or combinations thereof. Two or more catalytic metal precursors may be utilized when two catalytic metals are desired. However, some embodiments may include only one of Ni, W, Mo, or Co. For example, the catalyst support material may be impregnated by a mixture of nickel nitrate hexahydrate (that is, $Ni(NO_3)_2 \cdot 6H_2O$) and ammonium metatungstate (that is, (NH4)6H2W12O40) if a W—Ni hydrocracking catalyst is desired. The impregnated extrudate may be dried at from 80° C. to 120° C. for from 4 hours to 10 hours and then calcinated at from 450° C. to 500° C. for from 4 hours to 6 hours. For the comulling method, the mesoporous zeolite may be mixed with alumina, binder, and the compounds comprising W or Mo, Ni or Co (for example, MoO3 or nickel nitrate hexahydrate if Mo—Ni is desired).

It should be understood that some embodiments of the presently-described methods and systems may utilize a hydrocracking catalyst that includes a mesoporous zeolite (that is, having an average pore size of from 2 nm to 50 nm). However, in other embodiments, the average pore size of the zeolite may be less than 2 nm (that is, microporous).

According to one or more embodiments described, the volumetric ratio of HDM catalyst:transition catalyst HDN catalyst:hydrocracking catalyst may be 5-20:5-30:30-70:5-30. The ratio of catalysts may depend at least partially on the metal content in the oil feedstock processed.

Figure 3:
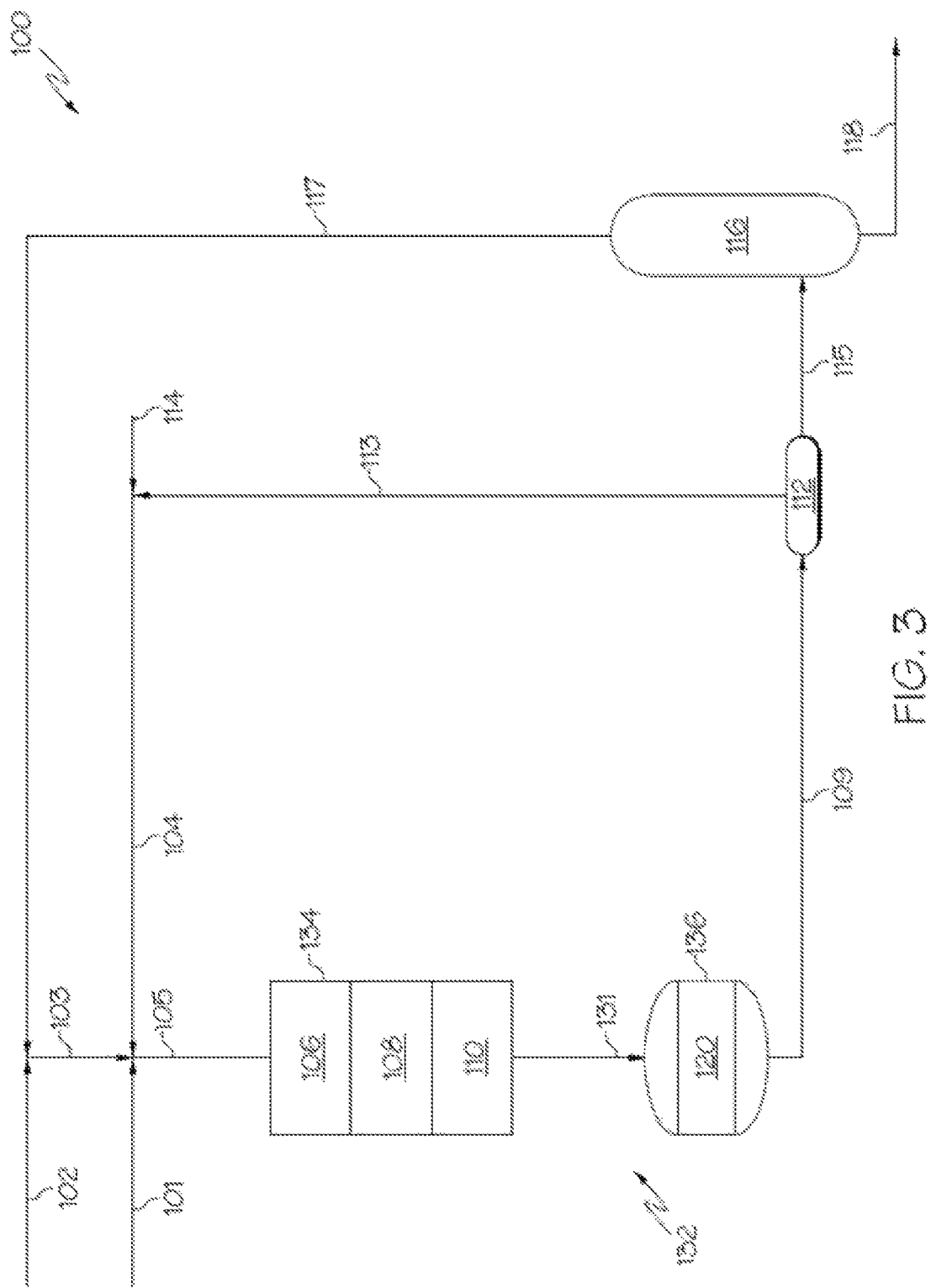
FIG. 3 depicts a generalized diagram of a chemical pretreatment system which includes a hydrodemetalization (HDM) catalyst, a transition catalyst, and a hydrodenitrogenation (HDN) catalyst and a downstream packed bed pretreatment reactor comprising a hydrocracking catalyst, according to one or more embodiments described in this disclosure.

Now referring to FIG. 3, according to additional embodiments, the hydrotreatment catalyst system 132 may include multiple packed bed reaction zones arranged in series (for example, a HDM reaction zone 106, a transition reaction zone 108, and a HDN reaction zone 110) and each of these reaction zones may comprise a catalyst bed. Each of these zones may be contained in a single reactor as a packed bed reactor with multiple beds in series, shown as an upstream packed bead hydrotreating reactor 134 in FIG. 3, and a downstream packed bed hydrocracking reactor 136. In other embodiments, the HDM reaction zone 106, the transition reaction zone 108, and the HDN reaction zone 110 may be contained in a plurality of packed bed reactors arranged in series with a downstream packed bed hydrocracking reactor 136. In further embodiments, each reaction zone is contained in a separate, single packed bed reactor. The upstream packed bed hydrotreating reactor 134 or plurality of upstream packed bed reactors may include the HDM reaction zone 106, the transition reaction zone 108, and the HDN reaction zone 110. The downstream packed bed hydrocracking reactor 136 may include the hydrocracking reaction zone 120. In such embodiments, the HDM reaction zone 106, the transition reaction zone 108, the HDN reaction zone 110, and the hydrocracking reaction zone 120 may utilize the respective catalysts, processing conditions, et cetera, disclosed with respect to the system of FIG. 2. The configuration of the upstream packed bed hydrotreating reactor 134 or plurality of upstream packed bed reactors of FIG. 3 may be particularly beneficial when reaction conditions such as, but not limited to, hydrogen content, temperature, or pressure are different for operation of the upstream packed bed hydrotreating reactor 134 or plurality of upstream packed bed reactors and the downstream packed bed hydrocracking reactor 136. In such embodiments, a stream 131 is passed from the upstream packed bed hydrotreating reactor 134 or plurality of upstream packed bed reactors to the downstream packed bed hydrocracking reactor 136.

Figure 4:
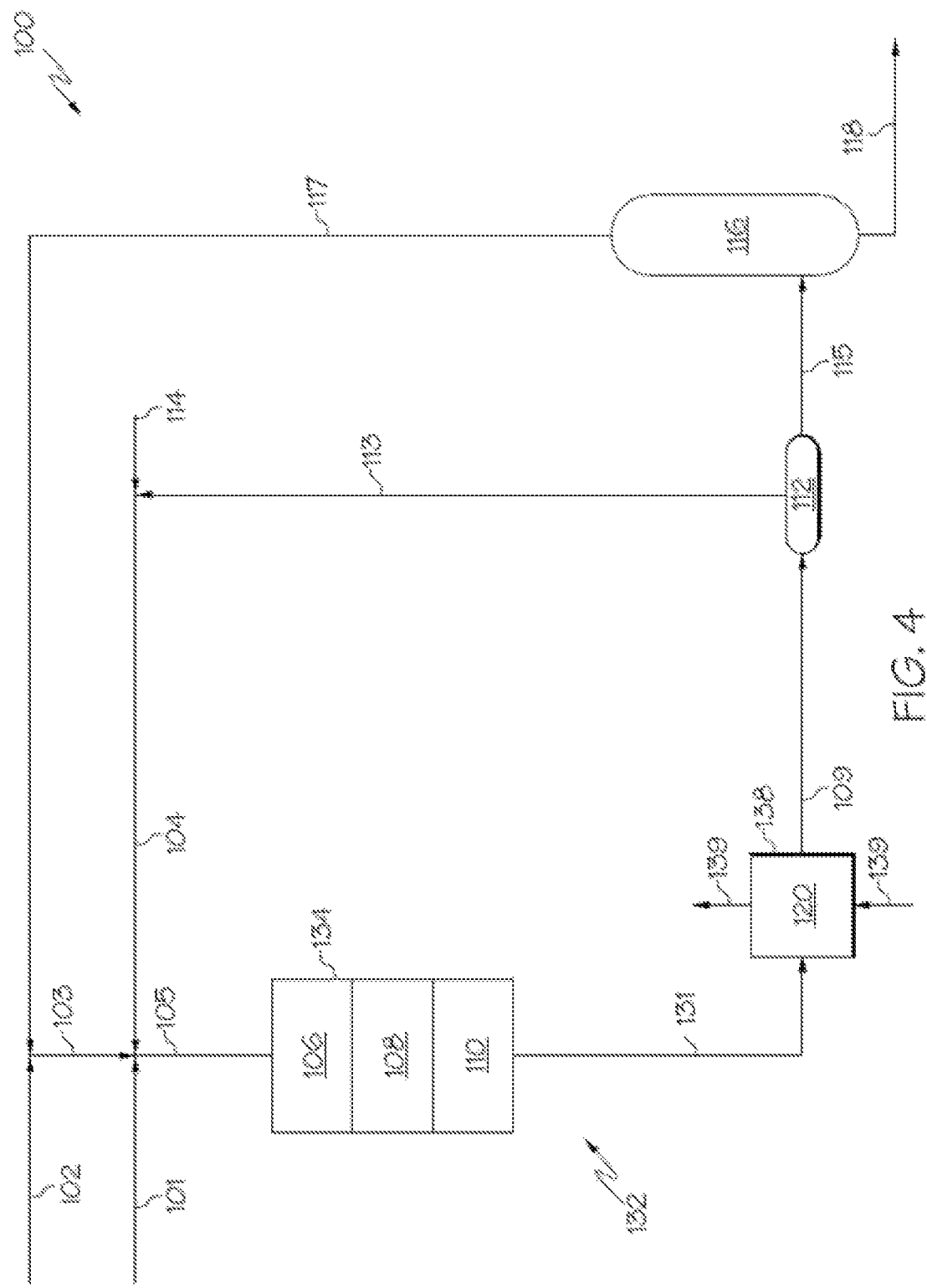
FIG. 4 depicts a generalized diagram of a chemical pretreatment system which includes a hydrodemetalization (HDM) catalyst, a transition catalyst, and a hydrodenitrogenation (HDN) catalyst and a downstream fluidized bed pretreatment reactor comprising a hydrocracking catalyst, according to one or more embodiments described in this disclosure.

Now referring to FIG. 4, according to additional embodiments, the hydrotreatment catalyst system 132 may include multiple packed bed reaction zones arranged in series (for example, a HDM reaction zone 106, a transition reaction zone 108, and a HDN reaction zone 110) and each of these reaction zones may comprise a catalyst bed. Each of these zones may be contained in a single reactor as a packed bed reactor with multiple beds in series, shown as an upstream packed bed hydrotreating reactor 134 in FIG. 3, and a downstream fluidized bed hydrocracking reactor 138. In other embodiments, the HDM reaction zone 106, the transition reaction zone 108, and the HDN reaction zone 110 may each be contained in a plurality of packed bed reactors arranged in series with a downstream packed bed hydrocracking reactor 136. In further embodiments, each reaction zone is contained in a separate, single packed bed reactor. The upstream packed bed hydrotreating reactor 134 or plurality of upstream packed bed reactors may include the HDM reaction zone 106, the transition reaction zone 108, and the HDN reaction zone 110. The downstream fluidized bed hydrocracking reactor 138 may include the hydrocracking reaction zone 120. In such embodiments, the HDM reaction zone 106, the transition reaction zone 108, the HDN reaction zone 110, and the hydrocracking reaction zone 120 may utilize the respective catalysts, processing conditions, et cetera, disclosed with respect to the system of FIG. 2. The configuration of the upstream packed bed hydrotreating reactor 134 or plurality of upstream packed bed reactors of FIG. 4 may be particularly beneficial when reaction conditions such as, but not limited to, hydrogen content, temperature, or pressure are different for operation of the upstream packed bed hydrotreating reactor 134 or plurality of upstream packed bed reactors and the downstream fluidized bed hydrocracking reactor 138. A process fluid 139 may fluidize the hydrocracking catalyst of the hydrocracking reaction zone 120. In such embodiments, a stream 131 is passed from the upstream packed bed hydrotreating reactor 134 or plurality of upstream packed bed reactors to the downstream fluidized bed hydrocracking reactor 138. The fluidized bed of the embodiment of FIG. 4 may be beneficial with particular hydrocracking catalysts as compared to the packed bed configurations of FIGS. 2 and 3.

Referring now to FIG. 5, in one or more embodiments, the upgraded oil (present in separation input stream 410) may be introduced to a separation unit 412 which separates the upgraded oil into one or more transportation fuels. For example, the separation input stream 410 may be separated into one or more of gasoline 414, kerosene 416, or diesel 418. In one embodiment, such as depicted in FIG. 5, a single distillation column separates the contents of the separation input stream 410. In additional embodiments, multiple separation units are utilized for the separation of the separation input stream 410 into three or more streams.

In additional embodiments, other process products are contemplated in addition to, or in combination with, the transportation fuels described herein. For example, some fraction of the separation input stream 410 may be a non-transportation fuel which may be further processed or recycled in the system for further processing.

EXAMPLES

The various embodiments of methods and systems for the upgrading of a heavy fuel will be further clarified by the following examples. The examples are illustrative in nature, and should not be understood to limit the subject matter of the present disclosure.

Example 1

Preparation of Mesoporous Hydrocracking Catalyst

A hydrocracking catalyst comprising mesoporous zeolite as described previously in this disclosure was synthesized. 74.0 g of commercial NaY zeolite (commercially available as CBV-100 from Zeolyst) was added in 400 milliliters (mL) of 3 molar (M) sodium hydroxide (NaOH) solution and was stirred at 100° C. for 12 hours. Then, 60.0 g of cetyl trimethylammonium bromide (CTAB) was added into prepared mixture while the acidity was controlled at 10 pH with 3 M hydrochloric acid solution. The mixture was aged at 80° C. for 9 hours, and then transferred into a Teflon-lined stainless steel autoclave and crystallized at 100° C. for 24 hours. Following the crystallization, the sample was washed with deionized water, dried at 110° C. for 12 hours, and calcined at 550° C. for 6 hours. The as-made sample was ion-exchanged with 2.5 M ammonium nitrate ($NH_4NO_3$) solution at 90° C. for 2 hours, followed by a steam treatment (at a flow rate of 1 milliliter per minute (mL/min)) at 500° C. for 1 hour. Then, the sample was ion-exchanged with 2.5 M $NH_4NO_3$ solution again. Finally, the sample was dried at 100° C. for 12 hours and calcined at 550° C. for 4 hours to form a mesoporous zeolite Y. In a mortar, 34 grams (g) of the mesoporous zeolite Y, 15 g of molybdenum trioxide ($MoO_3$), 20 g of nickel(II) nitrate hexahydrate ($Ni(NO_3)_2 \cdot 6H_2O$), and 30.9 g of alumina (commercially available as PURALOX® HP 14/150 from Sasol) were mixed evenly. Then, 98.6 g of binder made from alumina (commercially available as CATAPAL® from Sasol) and diluted nitric acid ($HNO_3$) (ignition of loss: 70 wt. %) was added, which pasted the mixture to form a dough by adding an appropriate amount of water. The dough was extruded with an extruder to form a cylindered extrudate. The extrudate was dried at 110° C. overnight and calcinated at 500° C. for 4 hours.

Example 2

Preparation of Conventional Hydrocracking Catalyst

A conventional hydrocracking catalyst (including a microporous zeolite) was produced by a method similar to that of Example 1 which utilized a commercial microporous zeolite. In a mortar, 34 g of microporous zeolite (commercially available as ZEOLYST® CBV-600 from Micrometrics), 15 g of $MoO_3$, 20 g of $Ni(NO_3)_2 6H_2O$, and 30.9 g of alumina (commercially available as PURALOX® HP 14/150 from Sasol) were mixed evenly. Then, 98.6 g of binder made from boehmite alumina (commercially available as CATAPAL® from Sasol) and diluted nitric acid ($HNO_3$) (ignition of loss: 70 wt. %) was added, which pasted the mixture to form a dough by adding an appropriate amount of water. The dough was extruded with an extruder to form a cylindered extrudate. The extrudate was dried at 110° C. overnight and calcinated at 500° C. for 4 hours.

Example 3

Analysis of Prepared Hydrocracking Catalysts

The prepared catalysts of Examples 1 and 2 were analyzed by BET analysis to determine surface area and pore volume. Additionally, micropore (less than 2 nm) and mesopore (greater than 2 nm) surface area and pore volume were determined. The results are shown in Table 2, which shows the catalyst of Example 1 (conventional) had more micropore surface area and micropore pore volume than mesopore surface area and mesopore pore volume. Additionally, the catalyst of Example 2 had more mesopore surface area and mesopore pore volume than micropore surface area and micropore pore volume. These results indicate that the catalyst of Example 1 was microporous (that is, average pore size of less than 2 nm) and the catalyst of Example 2 was mesoporous (that is, average pore size of at least 2 nm).

TABLE 2

Porosity Analysis of Catalysts of Example 1 and Example 2

| Sample | Catalyst of Example 2 (conventional) | Catalyst of Example 1 |
|---|---|---|
| Surface area ($m^2/g$) | 902 | 895 |
| Micropore (<2 nm) ($m^2/g$) | 747 | 415 |
| Mesopore (>2 nm) ($m^2/g$) | 155 | 480 |
| Mesopore ratio (%) | 17.2 | 53.6 |
| Pore volume, mL/g | 0.69 | 1.05 |
| Micropore (<2 nm), (mL/g) | 0.41 | 0.25 |
| Mesopore (>2 nm). (mL/g) | 0.28 | 0.8 |
| Mesopore ratio (%) | 40.6 | 76.2 |

Example 4

Preparation of Mesoporous HDN Catalyst

A mesoporous HDN catalyst was prepared by the method described, where the mesoporous HDN catalyst had a measured average pore size of 29.0 nm. First, 50 g of mesoporous alumina was prepared by mixing 68.35 g of boehmite alumina powder (commercially available as CATAPAL® from Sasol) in 1000 mL of water at 80° C. Then, 378 mL of 1 M HNO3 was added with the molar ratio of H+ to Al3+ equal to 1.5 and the mixture was kept stirring at 80° C. for 6 hours to obtain a sol. Then, 113.5 g of triblock copolymer (commercially available as PLURONIC® P123 from BASF) was dissolved in the sol at room temperature and then aged for 3 hours, where the molar ratio of the copolymer to Al was equal to 0.04). The mixture was then dried at 110° C. overnight and then calcined at 500° C. for 4 hours to form a mesoporous alumina.

The catalyst was prepared from the mesoporous alumina by mixing 50 g (dry basis) of the mesoporous alumina with 41.7 g (12.5 g of alumina on dry basis) of acid peptized alumina (commercially available as CATAPAL® from Sasol). An appropriate amount of water was added to the mixture to form a dough, and the dough material was extruded to form trilobe extrudates. The extrudates were dried at 110° C. overnight and calcinated at 550° C. for 4 hours. The calcinated extrudates were wet incipient impregnated with 50 mL of aqueous solution containing 94.75 g of ammonium heptanmolybdate, 12.5 g of nickel nitrate, and 3.16 g of phosphoric acid. The impregnated catalyst was dried 110° C. overnight and calcinated at 500° C. for 4 hours.

Example 5

Preparation of Conventional HDN Catalyst

A catalyst was prepared from the conventional alumina by mixing 50 g (dry basis) of the alumina (commercially available as PURALOX® HP 14/150 from Sasol) with 41.7 g (that is, 12.5 g of alumina on dry basis) of acid peptized alumina (commercially available as CATAPAL® from Sasol). Appropriate amount of water was added to the mixture to form a dough, and the dough material was extruded to form trilobe extrudates. The extrudates were dried at 110° C. overnight and calcinated at 550° C. for 4 hours. The calcinated extrudates were wet incipient impregnated with 50 mL of aqueous solution containing 94.75 g of ammonium heptanmolybdate, 12.5 g of nickel nitrate, and 3.16 g of phosphoric acid. The impregnated catalyst was dried 110° C. overnight and calcinated at 500° C. for 4 hours. The conventional HDN catalyst had a measured average pore size of 10.4 nm.

Example 6

Catalytic Performance of Prepared HDN Catalysts

In order to compare the reaction performance of the catalysts of Example 4 and Example 5, both catalysts were tested in a fixed bed reactor. For each run, 80 mL of the selected catalyst was loaded. The feedstock properties, operation conditions, and results are summarized in Table 3. The results showed that the hydrodenitrogenation performance of the catalyst of Example 4 is better than that of the conventional catalyst of Example 5.

TABLE 3

Porosity Analysis of Catalysts of Example 4 and Example 5

| Catalyst | Feed Oil | Example 5 (conventional) | Example 4 |
|---|---|---|---|
| Conditions | | | |
| Temperature (° C.) | | 390 | 390 |
| Pressure (bar) | | 150 | 150 |
| Liquid hourly space velocity (LHSV) (hours$^{-1}$) | | 0.5 | 0.5 |
| H$_2$/oil ratio (L/L) | | 1200 | 1200 |
| Product properties | | | |
| Density | 0.8607 | 0.8423 | 0.8391 |
| C (wt. %) | 85.58 | 86.43 | 86.51 |
| H (wt %) | 12.37 | 13.45 | 13.44 |
| S (ppmw) | 19810 | 764 | 298 |
| N (ppmw) | 733 | 388 | 169 |
| C5-180° C. (wt. %) | 20.19 | 17.00 | 17.62 |
| 180-350° C. (wt. %) | 30.79 | 36.93 | 39.00 |
| 350-540° C. (wt. %) | 30.27 | 30.65 | 29.12 |
| >540° C. (wt. %) | 18.75 | 14.32 | 12.67 |

Example 7

Catalytic Performance of HDN and Hydrotreating Catalysts

To compare a conventional catalyst system, which includes the catalyst of Example 2 and the catalyst of Example 5 with a catalyst system, which includes the catalyst of Example 1 and the catalyst of Example 4, experiments were performed in a four-bed reactor system. The four-bed reactor unit included an HDM catalyst, a transition catalyst, an HDN catalyst, and a hydrocracking catalyst, all in series. The feed and reactor conditions were the same as those reported in Table 3. Table 4 shows the components and volumetric amount of each component in the sample systems. The 300 mL reactor was utilized for the testing.

TABLE 4

Catalyst Bed Loading

| | Sample System 1 (Conventional) | Sample System 2 | Volume (mL) |
|---|---|---|---|
| HDM Catalyst | Commercially available HDM catalyst | Commercially available HDM catalyst | 15 |
| Transition Catalyst | Commercially available transition catalyst of HDM and HDS functions | Commercially available transition catalyst of HDM and HDS functions | 15 |
| HDN Catalyst | Catalyst of Example 5 | Catalyst of Example 4 | 90 |
| Hydrocracking Catalyst | Catalyst of Example 2 | Catalyst of Example 1 | 30 |

Table 5 reports the catalytic results for Sample System 1 and Sample System 2 of Table 4 with liquid hourly space velocities of 0.2 hour-1 and 0.3 hour-1. The results showed that the catalyst system that included the catalysts of Example 1 and Example 4 (Sample System 2) exhibited a better performance in hydrodenitrogenation, hydrodesulfurization, and conversion of 540° C.+ residues.

TABLE 5

Catalyst Performance Results

| | LHSV (hour$^{-1}$) | | | |
|---|---|---|---|---|
| | 0.2 | | 0.3 | |
| Catalyst system | Sample System 1 (Conventional) | Sample System 2 | Sample System 1 (Conventional) | Sample System 2 |
| Product properties | | | | |
| Density | 0.8306 | 0.771 | 0.8442 | 0.8181 |
| S (ppmw) | 73 | 230 | 301.7 | 238 |
| N (ppmw) | 5 | <5 | 237.3 | 23 |
| Product yield, wt % FF | | | | |
| C1 | 0.3 | 0.4 | 0.4 | 0.6 |
| C2 | 0.3 | 0.6 | 0.4 | 0.3 |
| C3 | 0.4 | 2.1 | 0.8 | 0.5 |
| nC4 | 0.1 | 3.8 | 0.1 | 0.1 |
| iC4 | 0.4 | 2.7 | 0.5 | 0.6 |
| <180° C. | 18.4 | 53.3 | 17.0 | 24.4 |
| 180-350° C. | 41.4 | 31.7 | 37.4 | 46.1 |
| 350-540° C. | 30.5 | 3.2 | 30.6 | 22.0 |
| >540° C. | 8.4 | 0.0 | 13.0 | 3.9 |
| C5+ | 98.7 | 88.1 | 98.1 | 96.4 |

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The present disclosure includes one or more non-limiting aspects. A first aspect may include a method for processing heavy oil, the method comprising: upgrading at least a portion of the heavy oil to form an upgraded oil, the upgrading comprising contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil; and passing at least a portion of the upgraded oil to a separation device that separates the upgraded oil into one or more transportation fuels; wherein the final boiling point of the upgraded oil is less than or equal to 540° C.

A second aspect may include a method for processing heavy oil, the method comprising: upgrading at least a portion of the heavy oil to form an upgraded oil, the upgrading comprising contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil; and passing at least a portion of the upgraded oil to a separation device that separates the upgraded oil into one or more transportation fuels; wherein at least the heaviest components of the upgraded oil are passed to the separation device.

Another aspect includes any of the previous aspects, wherein the transportation fuels are selected from gasoline, kerosene, or diesel.

Another aspect includes any of the previous aspects, wherein the separation device comprises a distillation column.

Another aspect includes any of the previous aspects, wherein the separation device comprises a series of separation units.

Another aspect includes any of the previous aspects, wherein the hydrodemetalization catalyst, the transition catalyst, and the hydrodenitrogenation catalyst are positioned in series in a plurality of reactors; and wherein the hydrocracking catalyst is positioned in a reactor downstream of the plurality of reactors.

Another aspect includes any of the previous aspects, wherein the second reactor is a packed bed reactor.

Another aspect includes any of the previous aspects, wherein the second reactor is a fluidized bed reactor.

Another aspect includes any of the previous aspects, wherein the hydrocracking catalyst comprises a mesoporous zeolite and one or more metals, where the mesoporous zeolite has an average pore size of from 2 nm to 50 nm.

Another aspect includes any of the previous aspects, wherein the hydrodenitrogenation catalyst comprises one or more metals on an alumina support, the alumina support having an average pore size of from 2 nm to 50 nm.

Another aspect includes any of the previous aspects, wherein the heavy oil comprises crude oil, and wherein the crude oil has an American Petroleum Institute (API) gravity of from 25 degrees to 50 degrees.

What is claimed is:

1. A method for processing heavy oil, the method comprising:
   upgrading at least a portion of the heavy oil to form an upgraded oil, the upgrading comprising contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil; and
   passing at least a portion of the upgraded oil to a separation device that separates the upgraded oil into one or more transportation fuels;
   wherein the final boiling point of the heavy oil is greater than 540° C.; and
   wherein the final boiling point of the upgraded oil is less than or equal to 540° C.

2. The method of claim 1, wherein the transportation fuels are selected from gasoline, kerosene, or diesel.

3. The method of claim 1, wherein the separation device comprises a distillation column.

4. The method of claim 1, wherein the separation device comprises a series of separation units.

5. The method of claim 1, wherein the hydrodemetalization catalyst, the transition catalyst, and the hydrodenitrogenation catalyst are positioned in series in a plurality of reactors; and
   wherein the hydrocracking catalyst is positioned in a reactor downstream of the plurality of reactors.

6. The method of claim 5, wherein the reactor downstream of the plurality of reactors is a packed bed reactor.

7. The method of claim 5, wherein the reactor downstream of the plurality of reactors is a fluidized bed reactor.

8. The method of claim 1, wherein the hydrocracking catalyst comprises a mesoporous zeolite and one or more metals, where the mesoporous zeolite has an average pore size of from 2 nm to 50 nm.

9. The method of claim 1, wherein the hydrodenitrogenation catalyst comprises one or more metals on an alumina support, the alumina support having an average pore size of from 2 nm to 50 nm.

10. The method of claim 1, wherein the heavy oil comprises crude oil, and wherein the crude oil has an American Petroleum Institute (API) gravity of from 25 degrees to 50 degrees.

11. The method of claim 1, wherein the at least a portion of the upgraded oil is directly passed to the separation device.

12. A method for processing heavy oil, the method comprising:
    upgrading at least a portion of the heavy oil to form an upgraded oil, the upgrading comprising contacting the heavy oil with a hydrodemetalization catalyst, a transition catalyst, a hydrodenitrogenation catalyst, and a hydrocracking catalyst to remove at least a portion of metals, nitrogen, or aromatics content from the heavy oil and form the upgraded oil; and
    passing at least a portion of the upgraded oil to a separation device that separates the upgraded oil into one or more transportation fuels;
    wherein at least the highest boiling point components of the upgraded oil are passed to the separation device.

13. The method of claim 12, wherein the transportation fuels are selected from gasoline, kerosene, or diesel.

14. The method of claim 12, wherein the separation device comprises a distillation column.

15. The method of claim 12, wherein the separation device comprises a series of separation units.

16. The method of claim 12, wherein the hydrodemetalization catalyst, the transition catalyst, and the hydrodenitrogenation catalyst are positioned in series in a plurality of reactors; and
   wherein the hydrocracking catalyst is positioned in a reactor downstream of the plurality of reactors.

17. The method of claim 16, wherein the reactor downstream of the plurality of reactors is a packed bed reactor.

18. The method of claim 16, wherein the reactor downstream of the plurality of reactors is a fluidized bed reactor.

19. The method of claim 12, wherein the hydrocracking catalyst comprises a mesoporous zeolite and one or more metals, where the mesoporous zeolite has an average pore size of from 2 nm to 50 nm.

20. The method of claim 12, wherein the hydrodenitrogenation catalyst comprises one or more metals on an alumina support, the alumina support having an average pore size of from 2 nm to 50 nm.

21. The method of claim 12, wherein the heavy oil comprises crude oil, and wherein the crude oil has an American Petroleum Institute (API) gravity of from 25 degrees to 50 degrees.

22. The method of claim 12, wherein the at least a portion of the upgraded oil is directly passed to the separation device.

* * * * *